United States Patent
Heath et al.

(10) Patent No.: US 6,985,455 B1
(45) Date of Patent: Jan. 10, 2006

(54) METHOD AND SYSTEM FOR PROVIDING SATELLITE BANDWIDTH ON DEMAND USING MULTI-LEVEL QUEUING

(75) Inventors: Robert Jeff Heath, San Diego, CA (US); Robert J. Torres, Germantown, MD (US); Sreenivas Ramaswamy, Bethesda, MD (US); Stephanie Demers, Edison, NJ (US)

(73) Assignee: Hughes Electronics Corporation, El Segundo, CA (US)

( * ) Notice: Subject to any disclaimer, the term of this patent is extended or adjusted under 35 U.S.C. 154(b) by 857 days.

(21) Appl. No.: 09/631,269

(22) Filed: Aug. 2, 2000

Related U.S. Application Data

(63) Continuation-in-part of application No. 09/518,452, filed on Mar. 3, 2000, now Pat. No. 6,842,437.

(51) Int. Cl.
  H04B 7/185 (2006.01)
(52) U.S. Cl. .................... 370/316; 370/414; 370/429
(58) Field of Classification Search ............... 370/351, 370/395.1, 395.2, 395.21, 395.41, 395.42, 370/43, 310–319, 321–323, 325–346, 229, 370/230–234, 468, 437, 412–420, 428, 429, 370/401; 455/450, 12.1, 452.2; 714/42; 395/183.18; 710/57, 240–243, 52, 53, 65, 710/66, 68, 316, 26, 3
See application file for complete search history.

(56) References Cited

U.S. PATENT DOCUMENTS

| | | | |
|---|---|---|---|
| 3,848,093 A | 11/1974 | Edstrom | 179/15 |
| 3,851,104 A | 11/1974 | Willard et al. | 179/15 |
| 3,879,581 A | 4/1975 | Schlosser et al. | 179/15 |
| 4,220,821 A | 9/1980 | Lucas | 370/110 |
| 4,849,968 A * | 7/1989 | Turner | 370/232 |
| 5,193,090 A * | 3/1993 | Filipiak et al. | 370/440 |
| 5,315,586 A * | 5/1994 | Charvillat | 370/232 |
| 5,448,621 A | 9/1995 | Knudsen | 379/58 |

(Continued)

FOREIGN PATENT DOCUMENTS

EP    0790714    6/1997

OTHER PUBLICATIONS

"A New Satellite Multiple Access Technical For Packet Switching Using Combined Fixed And Demand Assignments", Hamid Ahmadi & Thomas Stern, Department of Electrical Engineering Columbia University, 1980, pp. 70.4.1-70.4.5.

(Continued)

*Primary Examiner*—Chau Nguyen
*Assistant Examiner*—Ian N. Moore
(74) *Attorney, Agent, or Firm*—Craig Plastrik

(57) ABSTRACT

An approach for allocating bandwidth in a satellite communication system is disclosed. The system includes a set of global queues that store bandwidth requests, which are received from a number of satellite terminals. The received bandwidth request include a high priority rate request, a low priority rate request, a high priority volume request, and a low priority volume request. A bandwidth control processor determines bandwidth request type and priority of the received bandwidth requests and places the bandwidth requests in the appropriate global queues based upon the determined bandwidth request type and priority. Each of the global queues corresponds to a data rate associated with of each a plurality of channels. The system also utilizes a set of local queues that correspond to the channels. The BCP moves the bandwidth requests from the global queues to the local queues. The BCP then allocates the transmission slots in response to the bandwidth requests stored in the local queues.

45 Claims, 10 Drawing Sheets

U.S. PATENT DOCUMENTS

| | | | | |
|---|---|---|---|---|
| 5,602,988 A | * | 2/1997 | Haulin | 714/42 |
| 5,677,905 A | | 10/1997 | Bigham et al. | 370/94.2 |
| 5,699,355 A | * | 12/1997 | Natarajan | 370/322 |
| 5,732,078 A | | 3/1998 | Arango | 370/355 |
| 5,757,771 A | * | 5/1998 | Li et al. | 370/235 |
| 5,757,784 A | | 5/1998 | Liebowitz et al. | 370/321 |
| 5,812,545 A | | 9/1998 | Liebowitz et al. | 370/337 |
| 5,864,541 A | | 1/1999 | Abu-Amara et al. | 370/253 |
| 5,883,819 A | | 3/1999 | Abu-Amara et al. | 364/578 |
| 5,886,907 A | | 3/1999 | Abu-Amara et al. | 364/578 |
| 5,893,924 A | * | 4/1999 | Vakkalagadda | 711/165 |
| 5,959,991 A | * | 9/1999 | Hatono et al. | 370/235.1 |
| 5,978,893 A | * | 11/1999 | Bakshi et al. | 711/171 |
| 6,018,527 A | * | 1/2000 | Yin et al. | 370/395.41 |
| 6,198,724 B1 | * | 3/2001 | Lam et al. | 370/233 |
| 6,212,164 B1 | * | 4/2001 | Murakami et al. | 370/230 |
| 6,339,802 B1 | * | 1/2002 | Hefferon et al. | 710/52 |
| 6,366,761 B1 | * | 4/2002 | Montpetit | 455/12.1 |
| 6,370,144 B1 | * | 4/2002 | Chao et al. | 370/395.42 |
| 6,381,228 B1 | * | 4/2002 | Prieto et al. | 370/323 |
| 6,389,031 B1 | * | 5/2002 | Chao et al. | 370/412 |
| 6,424,622 B1 | * | 7/2002 | Fan et al. | 370/230 |
| 6,445,707 B1 | * | 9/2002 | Iuoras et al. | 370/395.43 |
| 6,449,267 B1 | * | 9/2002 | Connors | 370/347 |
| 6,490,640 B1 | * | 12/2002 | Johansson | 710/52 |
| 6,504,820 B1 | * | 1/2003 | Oliva | 370/232 |
| 6,542,950 B1 | * | 4/2003 | Bodnar | 710/260 |
| 6,574,231 B1 | * | 6/2003 | Leung | 370/412 |
| 2002/0075882 A1 | * | 6/2002 | Donis et al. | 370/412 |

OTHER PUBLICATIONS

"Small-Terminal TDMA Satcom Networks; concepts, Techniques, and Implementation", Ronald Huff, The Ohio State University ElectroScience Laboratory Deptment of ELectrical Engineering , 1974, pp. 212-215.

"ATM via satellite: A framework and implementation", Anthony Hung, Marie-Jose Montpetit, and George Kesidis, Wireless Networks 4 (1998) 141-153.

* cited by examiner

| 16 | 24 | 0 | 8 |
|----|----|----|----|
| 20 | 28 | 4 | 12 |
| 18 | 26 | 2 | 10 |
| 22 | 30 | 6 | 14 |
| 17 | 25 | 1 | 9 |
| 21 | 29 | 5 | 13 |
| 19 | 27 | 3 | 11 |
| 23 | 31 | 7 | 15 |

*FIG. 7*

| 31 | 23 | 15 | 7 |
|----|----|----|----|
| 27 | 19 | 11 | 3 |
| 29 | 21 | 13 | 5 |
| 25 | 17 | 9 | 1 |
| 30 | 22 | 14 | 6 |
| 26 | 18 | 10 | 2 |
| 28 | 20 | 12 | 4 |
| 24 | 16 | 8 | 0 |

*FIG. 8*

| 15 | 7 | 31 | 23 |
|----|----|----|----|
| 11 | 3 | 27 | 19 |
| 13 | 5 | 29 | 21 |
| 9 | 1 | 25 | 17 |
| 14 | 6 | 30 | 22 |
| 10 | 2 | 26 | 18 |
| 12 | 4 | 28 | 20 |
| 8 | 0 | 24 | 16 |

*FIG. 9*

METHOD AND SYSTEM FOR PROVIDING SATELLITE BANDWIDTH ON DEMAND USING MULTI-LEVEL QUEUING

CROSS REFERENCE TO RELATED APPLICATIONS

This application is a continuation in part and is related to U.S. patent application Attorney Ser. No. 09/518,452, filed Mar. 3, 2000 now U.S. Pat. No. 6,842,437 and entitled "System for Providing Satellite Bandwidth on Demand Employing Uplink Frame Formatting for Smoothing and Mitigating Jitter and Dynamically Changing Numbers of Contention and Data Channels," which is incorporated herein by reference.

FIELD OF THE INVENTION

The present invention relates to satellite communications, and more particularly; to providing bandwidth on demand for a satellite uplink.

BACKGROUND OF THE INVENTION

Bandwidth on demand (BOD) in a satellite communication is advantageous because it makes more efficient use of the finite uplink resources of the satellite and correspondingly increases uplink capacity and useable bandwidth. Bandwidth efficiency, and in particular uplink bandwidth efficiency, is important when determining the profitability of a satellite communication system. Downlink efficiency generally becomes an issue when uplink efficiency approaches 100 percent.

A number of BOD satellite communication systems have been proposed. In a conventional BOD satellite system, a pre-assigned number of contention channels and data channels are configured by the system operator and are permanently assigned until they are reconfigured. Such a design is disadvantageous because the demand for contention channels can change. A satellite communication system using such a design makes less efficient use of the uplink bandwidth because contention channels could be used for data traffic when the demand for contention channels is low.

Other conventional BOD-type communication systems support only constant bit rate requests. User terminals requesting a constant bit rate are allocated permanent portions of a data channel until the user terminal requests that the allocation be terminated. A user terminal needing uplink bandwidth to send a file therefore requests a certain bit rate, sends the file, and then sends a de-allocation message to terminate the allocation. This approach is disadvantageous because of the increased messaging to set-up and de-allocate temporary channels which could otherwise be used for less bursty type traffic.

Conventional bandwidth on demand communication systems generally assign bandwidth in response to a bandwidth request via a single allocation. Thus, if the entire bandwidth request could not be satisfied, the user terminal would have to make additional bandwidth requests to obtain an allocation for the unsatisfied portion of the previous bandwidth requests.

A need therefore exists for a BOD communication system that efficiently processes the allocation and de-allocation of various sized bit rate requests, as well as volume-type requests for more bursty traffic. A BOD communication system is also needed to overcome the other disadvantages of conventional systems described above such as the dynamic use of channels as either data channels or contention channels. A need also exists for a BOD communication system which packs uplink data channels more efficiently to accommodate temporary bit rate requests, that is, volume requests for bursty traffic as well as constant bit rate requests and provide different grades of quality of service. A need also exists for a BOD communication system which generates a plurality of bandwidth allocations to satisfy a bandwidth request on a periodic basis rather than providing a requesting satellite terminal with whatever bandwidth is available at the moment and requiring the satellite terminal to re-request the allocated portion of the bandwidth request.

SUMMARY OF THE INVENTION

The above-mentioned disadvantages of BOD communication systems are overcome and a number of advantages are realized by the satellite communication system of the present invention. A satellite payload operates in conjunction with satellite terminals to dynamically use uplink channels as either contention channels or data channels. The number of contention channels increases as data channel usage decreases, allowing more data channels during peak demands for uplink bandwidth.

According to one aspect of the invention, a method is provided for performing bandwidth allocations. The method includes receiving a bandwidth request from a terminal and determining the bandwidth request type and priority of the received bandwidth request. The method also includes placing the bandwidth request in one of a plurality of a global queues based upon the determining step. Each of the global queues corresponds to a data rate of each of a plurality of channels. Additionally, the method includes moving the bandwidth request from the one global queue to one of a plurality of local queues; the plurality of local queues correspond to the plurality of channels. The method further includes allocating the transmission slots in response to the bandwidth request stored in the one local queue. Under the above approach, bandwidth allocations are processed efficiently.

According to another aspect of the invention, a system for performing bandwidth allocations comprises a plurality of global queues, in which each of the global queues is configured to store a bandwidth request received from a terminal. A bandwidth control processor is coupled the plurality of global queues. The bandwidth control processor is configured to determine bandwidth request type and priority of the received bandwidth request and to place the bandwidth request in one of a plurality of global queues based upon the determined bandwidth request type and priority. Each of the global queues corresponds to a data rate of each of a plurality of channels. A plurality of local queues are coupled to the BCP; the plurality of local queues correspond to the plurality of channels. One of the plurality of local queues stores the bandwidth request that is moved from the one global queue. The BCP allocates the transmission slots in response to the bandwidth request that is stored in the one local queue. Under this arrangement, system performance is enhanced.

In yet another aspect of the invention, a computer-readable medium containing program instructions for execution on a computer system, which when executed by a computer, cause the computer system to perform method steps for allocating bandwidth is disclosed. The method includes receiving a bandwidth request from a terminal and determining the bandwidth request type and priority of the received bandwidth request. The method also includes placing the bandwidth request in one of a plurality of a global queues based upon the determining step. Each of the global queues corresponds to a data rate of each of a plurality of channels. Additionally, the method includes moving the bandwidth request from the one global queue to one of a plurality of local queues; the plurality of local queues correspond to the plurality of channels. The method further includes allocating the transmission slots in response to the bandwidth request that is stored in the one local queue. This approach advantageously provides enhanced system throughput and queuing fairness.

BRIEF DESCRIPTION OF DRAWINGS

The various aspects, advantages and novel features of the present invention will be more readily comprehended from the following detailed description when read in conjunction with the appended drawings, in which:

FIG. 5 illustrates an uplink frame in system timing in accordance with an embodiment of the present invention;

FIGS. 6, 7, 8 and 9 illustrates a timeslot numbering scheme for uplink frames in accordance with an embodiment of the present invention;

FIG. 10 illustrates numbering of consecutive timeslots in a frame in accordance with an embodiment of the present invention;

Throughout the drawing figures, like reference numerals will be understood to refer to like parts and components.

DETAILED DESCRIPTION OF THE PREFERRED EMBODIMENTS

1. Satellite System Overview

Figure 1:
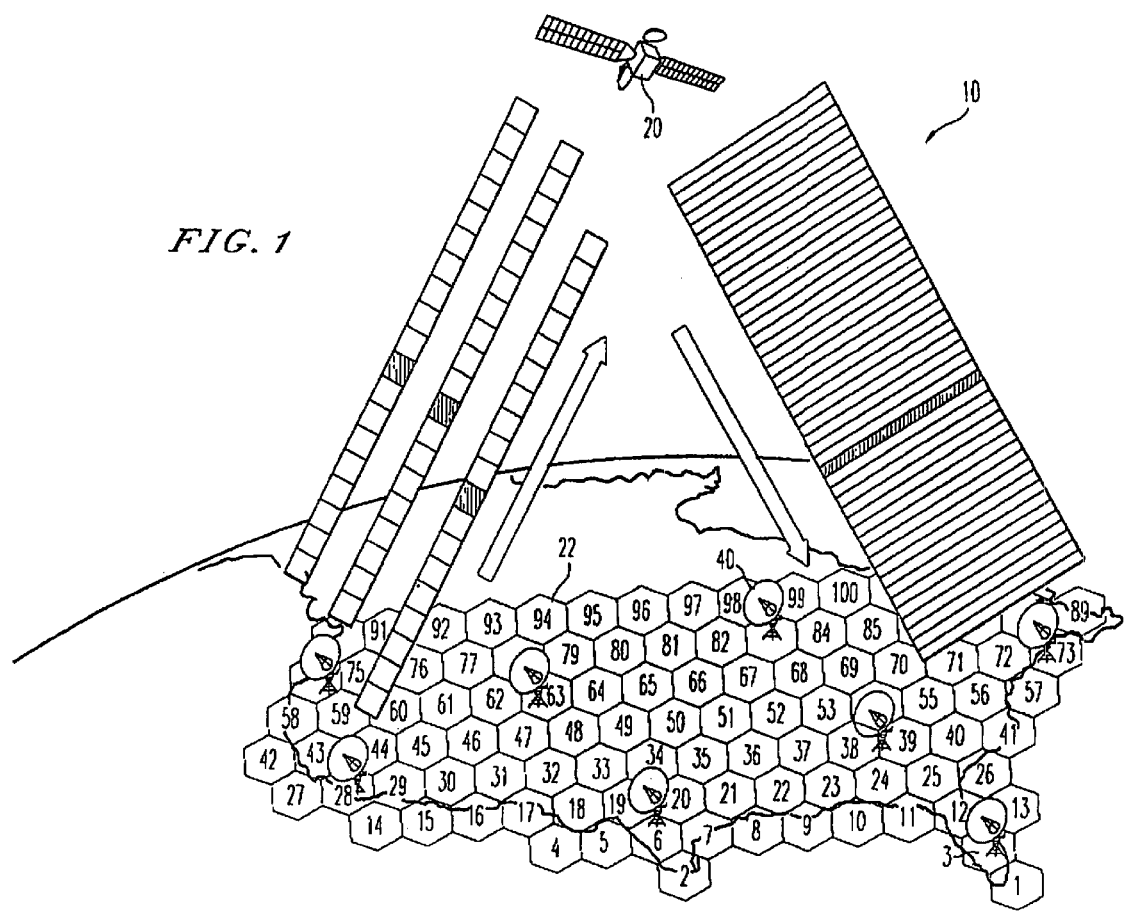
FIG. 1 illustrates the satellite communication system configured for bandwidth on demand, usage of multiple hi-gain spot beams and on-board packet routing in accordance with an embodiment of the present invention.
Figure 2A:
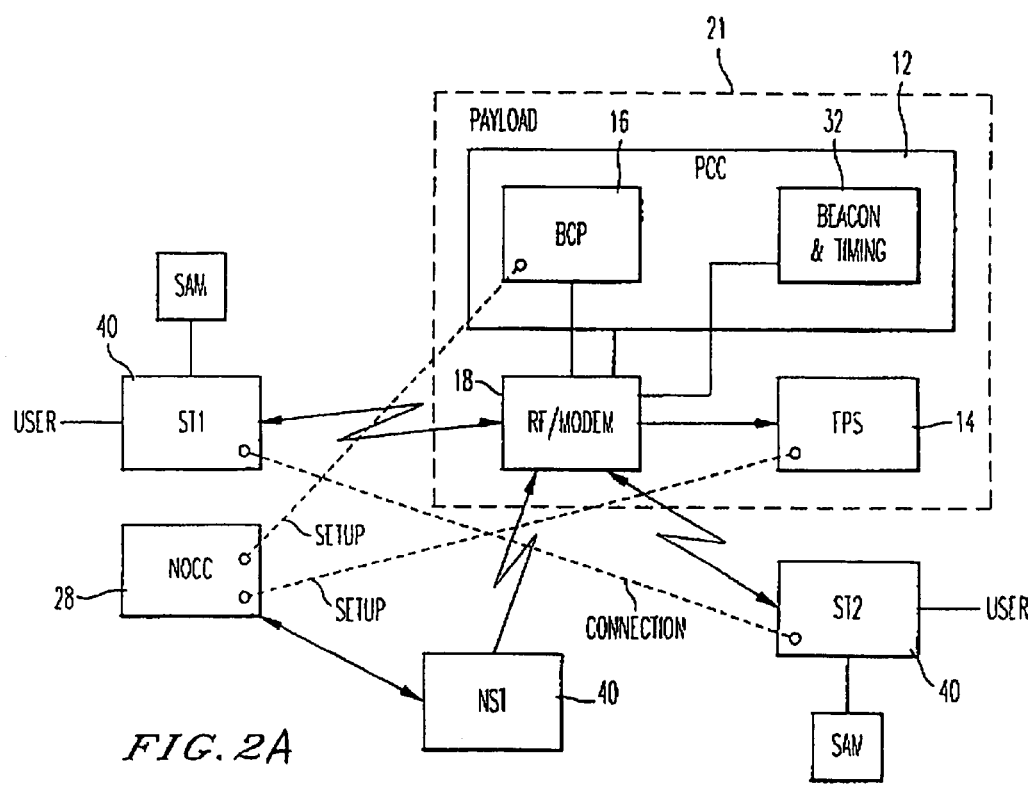
FIGS. 2A and 2B are block diagrams of a satellite payload and satellite terminals, and the request queues in the payload control computer (PCC), respectively, in accordance with an embodiment of the present invention.

With reference to FIG. 1, the broadband multimedia satellite system 10 of the present invention preferably employs one or more geosynchronous orbit (GEO) satellites 20 and offers a wide range of user data rates and services on a bandwidth-on-demand (BOD) basis. The system 10 uses the latest generation of high-power satellites, employing on-board digital signal processing, multiple high-gain spot beams, and on-board packet routing. The broadband multimedia satellite system 10 is preferably capable of supporting a maximum peak capacity of at least 10 Gigabits per second (Gbps) of user data in a point-to-point (PTP) transmission mode. Delivery of services to users is provided via low-cost ultra-small-aperture terminals (USATs) hereinafter referred to as satellite terminals (STs) 40. An ST 40 can be an end-user ST or a network ST (NST), as shown in FIG. 2A. The broadband multimedia satellite system 10 preferably operates in the 30/20 GHz Ka-band spectrum allocated to Ka-band Fixed Satellite Services (FSS). The system capacity is scalable by either the addition of satellites in adjacent orbital slots, or by adding satellites in the same orbital slot that are operated in a different frequency band to enable future system expansion.

The broadband multimedia satellite system 10 is a packet-based transmission system that enables the offering of bandwidth-on-demand (BOD) connections in support of voice, data, video, and other interactive services and applications such as interactive digital communications and high-speed internet (HSI) access. The combination of small terminal size with high throughput makes the broadband multimedia satellite system useful for users ranging from large and medium-sized corporations and other organizations to small businesses, and consumer/SOHO users. Raw data rates supported per single carrier are preferably 16.384 Mbps (8E1), 2.048 Mbps (E1), and 512 kbps (E1/4). A 128 kbps (E1/16) fall-back mode is also provided for terminals experiencing large rain fades and therefore provides for improved availability of lower-end terminal types. Interfaces into terrestrial networks (e.g., the public switched telephone network (PSTN), cellular networks and corporate data networks) allow seamless integration into existing communication system infrastructures.

A network operations control center (NOCC) 28 is provided, as shown in FIG. 2A, to perform a number of operations such as validating STs for authorized use of the system 10 resources and to support scheduled connections and BOD traffic. The system 10 also supports connectionless traffic that does not require NOCC involvement to establish the call. For a connection-oriented call, a satellite terminal (ST) communicates with the NOCC to receive tokens with which to request uplink bandwidth from the payload. In this connection mode, the NOCC can determine if sufficient bandwidth is available to meet ST requests therefrom For a connectionless call, an ST communicates with the payload 21 directly without first obtaining authorization from the NOCC using a contention channel request.

A fundamental difference between conventional FSS systems and the broadband multimedia satellite system 10 is the regenerative nature of the broadband multimedia satellite system payload 21 (FIG. 2). In a conventional FSS satellite-system, a single beam typically services the satellite coverage area Information transmitted by a central hub station is received by the satellite and broadcast to all user terminals within the footprint. The user terminals transmit back to their intended destination through the satellite to the hub station. Thus, the satellite simply acts as a repeater. Mesh connections (i.e., user terminal-to-user terminal connections) must always be routed through the hub creating additional latency, due to the double hop required.

Figure 3:
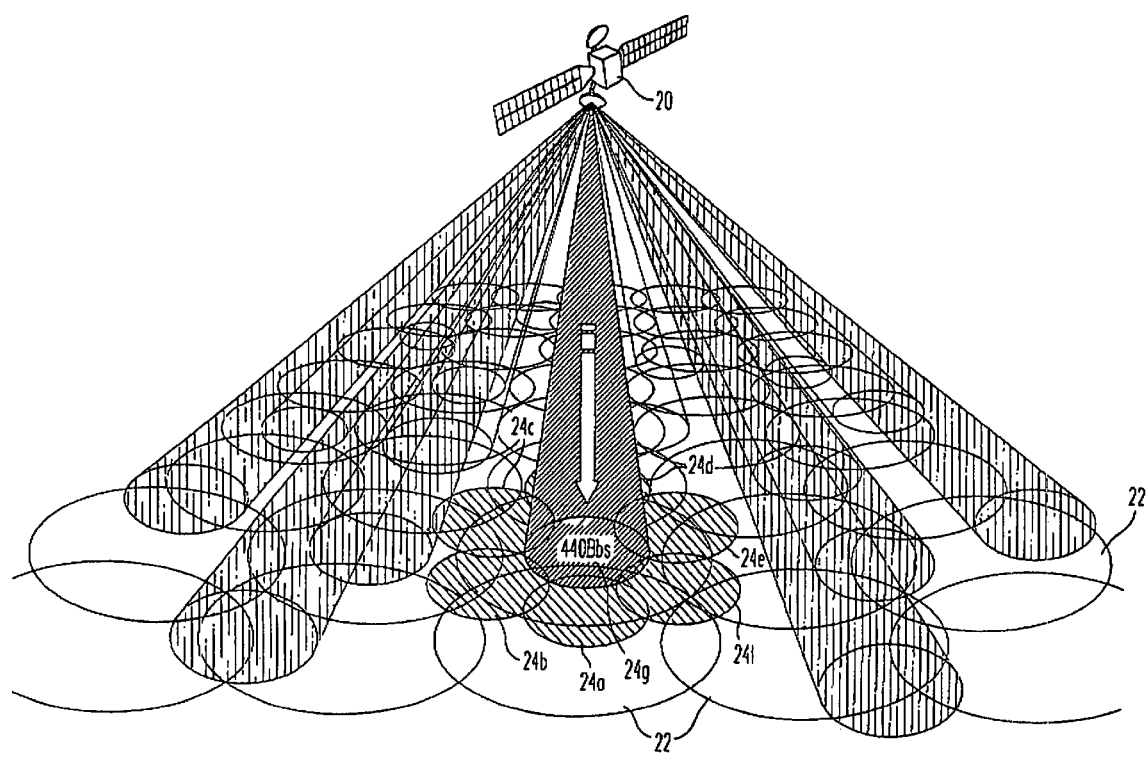
FIG. 3 illustrates uplink beams and downlink beams in a satellite communication system in accordance with an embodiment of the present invention.

In the broadband multimedia satellite system 10 of the present invention, however, the uplink uses approximately 112 spot beams, for example, that provide coverage for uplink cells 22 geographically distributed over the satellite coverage area, as shown in FIG. 1. The system 10 is provided with a satellite payload 21 which can combine inter-beam routing with a broadcast capability. Each uplink cell 22 preferably operates on a fixed polarization with a four-cell reuse pattern to maximize capacity density. The downlink coverage sub-divides each uplink cell 22 into seven microcells 24a through 24g, as shown in FIG. 3. Downlink microcells 24 are capable of operating in either polarization, but operationally are assigned a single polarization, except in areas where there is a high inbound capacity requirement. This enables the satellite 20 to take advantage of the peak gain available in each downlink beam for point-to-point (PTP) transmissions.

Additionally, the satellite 20 differs from conventional satellites in that user data or broadband multimedia packets are processed, and routed by the satellite payload 21. The satellite payload 21 therefore performs a significant amount of the switching and routing responsibilities previously relegated to the network control facility of the central hub station in conventional FSS systems.

A primary transmission function of the broadband multimedia satellite 20 is not to broadcast a received broadband multimedia packet to the entire coverage area. When operating in the PTP mode, the satellite payload 21 of the present invention receives a packet from an uplink cell 22 and routes it only to the downlink cell 24 in which a destination satellite terminal (ST) 40 is located. The payload 21 is also capable of replicating and routing a packet to up to forty multiple downlink cells 24 for point-to-multi-point (PMP) applications. The satellite payload 21 can also support PMP applications without replication. Each ST 40 within a downlink microcell 24 receives all broadband multimedia packets from the payload 21 and only processes those packets addressed to that specific ST 40. For a system 10 operating in North America, for example, each satellite 20 has the capability to transmit broadband multimedia packets to the continental United States (CONUS), Alaska, Hawaii, predefined parts of Canada and selected Latin America cities. There are preferably two CONUS broadcast beams (one for each polarization) that simultaneously cover all or a portion of the satellite coverage area. The system 10 is also configurable to transmit packets to all STs 40 in a cell 22, that is, to cell cast.

The payload 21 on-board the satellite 20 comprises receive antennas for receiving uplink beams (e.g., 106 beams) from various uplink cells 22, and downconverters (e.g., 120 Ka-band downconverters) for downconverting the frequency of the received signals for the processing thereof by a switch matrix (e.g., fast packet switch (FPS) 14). The FPS 14 connects a variable number of demodulators, which are represented by the RF/Modem unit 18 in FIG. 2A, to each uplink cell 22 based on demand.

Figure 2B:
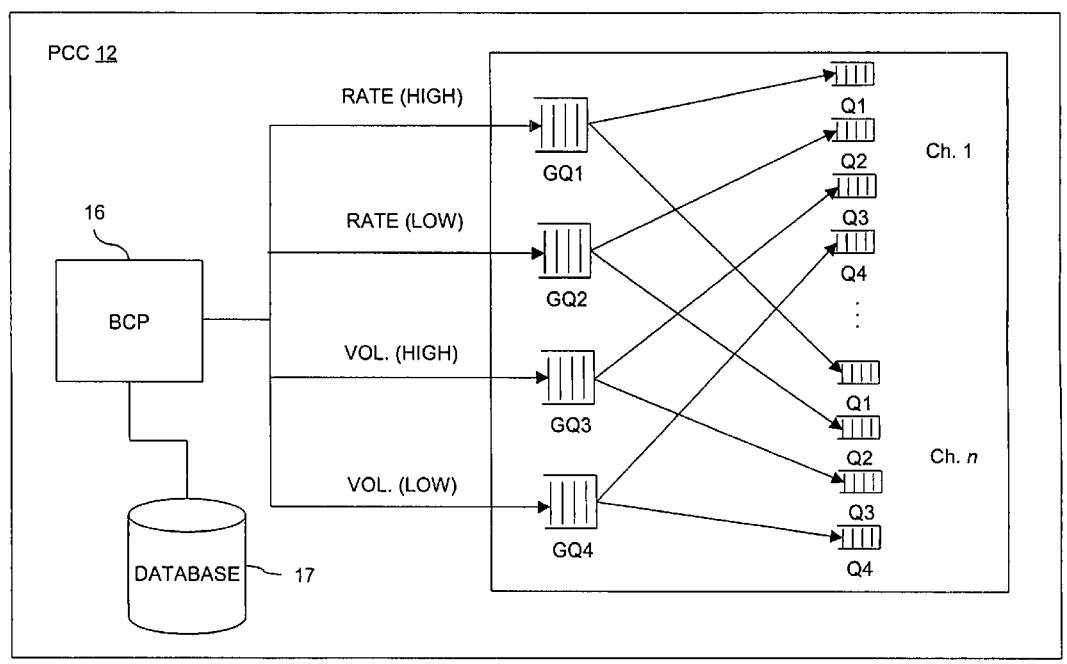

A payload control computer (PCC) 12 is provided to perform BOD and payload management operations. The PCC 12 includes a bandwidth control processor (BCP) 16 to manage the bandwidth requests from the STs 40. These bandwidth requests are processed by the BCP 16, according to one embodiment of the present invention, using two sets of queues (i.e., multi-level queues): global queues and local queues. FIG. 2B shows the sets of queues that are utilized by the BCP 16 to perform bandwidth allocation. The first set of queues is global queues, GQ1, GQ2, GQ3, and GQ4, corresponding to the type of request and associated priority. In an exemplary embodiment, two types of bandwidth allocation requests exist: a rate request and a volume request. It should be noted that other bandwidth requests include a rate release request to cease future allocations and a rate change request to alter the allocations (these requests are further described in Section 4). Each of the bandwidth allocation request types is prioritized according to two priority levels, low and high. The queues GQ1, GQ2, GQ3, and GQ4 correspond to the high priority rate request, the low priority rate request, the high priority volume request, and the low priority volume request, respectively. The request entries within each of these global queues GQ1, GQ2, GQ3, and GQ4 are subsequently moved to local queues Q1, Q2, Q3, and Q4. Each of the channels within the satellite 20 has a set of local queues Q1, Q2, Q3, and Q4. The use of the global and local queues is described in the subsequent Sections. In support of its bandwidth control functions, the BCP 16 also employs a database 17 to process follow-up volume requests (which is more fully discussed in Section 5).

With continued reference to FIG. 2A, the payload 21 preferably comprises 5376 E1, or the equivalent thereof, multi-rate demodulators for E1/4, E1 and 8E1 transmissions, for example, in accordance with the present invention. The FPS 14 switches the outputs of the demodulators among variable rate modulators (e.g., 24 modulators), which are also represented by the RF/Modem unit 18. The FPS 14 is preferably a 10 gigabits per second (Gbps) asynchronous transfer mode or ATM-type fast packet switch. Ka-band direct input/output (I/O) modulators generate hopping beams (e.g., 442 Mbps hopping beams) that are time division multiplexed with broadcast beams (e.g., two 147 Mbps broadcast beams). The dwell time per downlink cell 24 is dynamically determined based on demand. A bypass configuration is provided to allow the use of the satellite 20 as a bent-pipe transponder with coverage that can be adjusted. A transmit antenna is also provided which can generate, for example, 24 beams and is connected to the outputs of the modulators or the bypass circuit.

The broadband multimedia satellite system 10 of the present invention is advantageous because it can achieve high link availability and low packet loss rates. For example, availability that is typically higher than 99.7% is realized, as well as end-to-end packet loss rates typically better than 1 in $10^6$. Another advantage of the broadband multimedia satellite system 10 of the present invention is its ability to dynamically allocate resources to areas with higher demand. The satellite 20 provides for the flexible allocation of demodulator resources on the satellite payload 21 among the uplink cells 22. This flexibility allows the system 10 via the NOCC 28 to have a capacity planning function to adapt to both relatively short term (e.g., hours) and long term capacity requirement variations.

Figure 4:
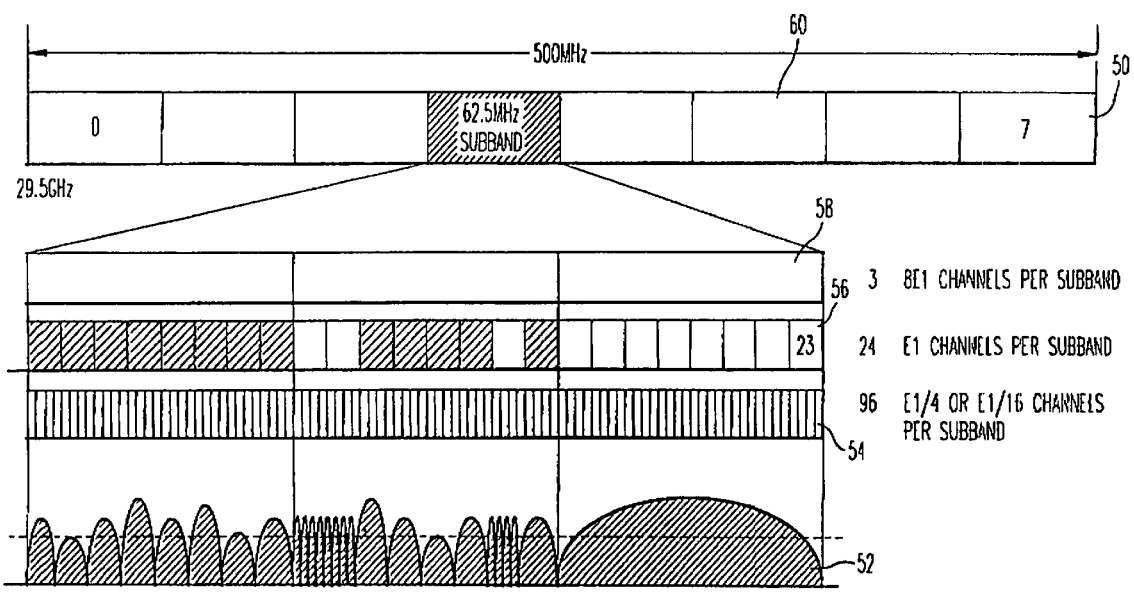
FIG. 4 illustrates uplink channelization in accordance with an embodiment of the present invention.

As shown in FIG. 4, the uplink utilizes an FDMA TDMA signal format with each ST transmitting at an assigned frequency, as indicated at 50, and time slot, as indicated at 52. The uplink user data packets use one of three-supported burst modes such as 521 kilo-symbols per second (ksps), 2.08 mega-symbols per second (Msps), or 16.67 Msps channels, as indicated at 54, 56 and 58, respectively. A total of preferably 16 sub-bands per satellite 20 are used with eight sub-bands 60 per polarization as indicated at 50. One or more sub-bands 60 can be allocated to each uplink cell 22. A sub-band 60 preferably accommodates the transmission capacity 24 E1 channels 56 or three 16.67 Msps channels 58 or 96 E1/4 channels 54, depending on the burst mode. All sub-bands allocated to a particular uplink cell 22 have the same polarization; therefore, STs 40 in that cell 22 are configured for the same polarization. Between zero and eight sub-bands 60 are allocated to each uplink cell 22 per satellite 20 based on traffic expectations from STs in that cell. The maximum capacity that can be allocated to a given uplink cell 22, therefore, is preferably eight sub-bands 60, which corresponds to 192 E1 channels. To avoid interference, a given sub-band is not allocated to geographically adjacent uplink cells 22.

Three basic downlink transmission modes are supported in accordance with the present invention. A point-to-point (PTP) mode provides mesh connectivity between the STs 40. The broadcast mode (e.g., a CONUS broadcast mode) is used to broadcast information to STs 40 located within a selected geographic area such as the CONUS. The beacon mode is used for system synchronization. Other uses for the PTP mode include multicast or packet replication and transmission to as many as 40 locations, and cell cast (i.e., packet broadcast to groups of seven downlink cells 24 or an uplink cell 22. The broadband multimedia satellite downlink architecture has the capability of flexibly allocating the total system capacity between PTP and CONUS broadcast capacity. The capacity division between the PTP mode and the broadcast mode is adjusted by changing the percentage of time the downlink is in the PTP mode versus the broadcast mode.

With reference to the beacon and timing block 32 in FIG. 2A, the beacon mode facilitates system synchronization by transmitting a 1/3 rate binary phase shift keying (BPSK) pseudo random noise (PRN) sequence once per 3 ms downlink frame using one of the downlink slots. The beacon uses a beam pattern designed to fit the entire coverage area of the system 10.

Each downlink frame is preferably 3 milliseconds (ms) divided into 138 slots that are shared between PTP, CONUS, and beacon transmissions. Transmission rates for the PTP and CONUS beams are 400 Mbps and 133 1/3 Mbps respectively. PTP bursts each occupy one slot, while the 1/3 rate CONUS bursts use 3 slots. Thus, the split between PTP and CONUS traffic can be changed in increments of three slots.

The downlink preferably consists of a set of as many as 24 independent and simultaneously moving high rate (400 Mbps) TDM carriers. Each TDM carrier contains the user traffic for a given geographic area The set of 24 TDM carriers can be redirected every downlink slot time (21.73 $\mu$s) to service a different downlink cell 24. Alternatively, the available power from the 24 TDM carriers is used to generate one of 2 TDM carriers serving a CONUS broadcast shaped beam and operating in a low rate mode of 133 1/3 Mbps (i.e., 400/3 Mbps).

To facilitate BOD access techniques, the broadband multimedia satellite 10 uses packetized transmissions. A broadband multimedia satellite packet undergoes a number of transformations as it is transmitted from an ST 40 through the satellite payload to another ST 40. Within an ST 40, the user data is first segmented into broadband multimedia satellite packets. Sets of multiple broadband multimedia satellite packets, along with forward error correction, access control security signature, and synchronization data, are used to form uplink bursts. The uplink bursts are then transmitted to the satellite 20 at the assigned frequency and time slot, as described above with reference to FIG. 4.

Upon receiving a burst, the satellite payload 21 decodes the broadband multimedia satellite packets and corrects errors, if necessary. Then, the packets are checked for an access control signature to ensure that it was transmitted from an authorized ST 40. If the burst is valid (i.e., authenticated and error free), the packets are extracted and routed to the appropriate destination. A satellite routing field contained in the header of each packet is used by the payload processor 21 to determine to which downlink cell 24 the packets are routed. The packets are encapsulated into a downlink TDM burst structure and transmitted on the downlink.

The destination ST 40 processes all downlink packets in the burst addressed to its cell 24 and extracts broadband multimedia satellite packets. The ST examines the addressing information within each packet and determines whether the packet should be processed further. If the packets are addressed to the destination ST, they are reassembled back into a packet of user data and forwarded to the user application.

With reference to the beacon and timing unit 32, system synchronization is maintained using the satellite beacon in conjunction with time of day (TOD) messages broadcast periodically by the spacecraft. The beacon allows both time and frequency synchronization between the STs 40 and satellite payload 21. Frequency alignment between the ST 40 and satellite payload (reference) is derived in the ST 40 from the recovered PN clock. Timing is generated from the 1.56 second beacon epoch. TOD is maintained on-board the satellite 20, and the satellite distributes this message to all downlink microcells 24 in the first half of the beacon epoch. At the epoch boundary, each ST 40 updates its time of day with the new value.

Broadband multimedia satellite terminals (nodes) utilize the appropriate type of carrier to support the data rate requirements of the application. Through commands by the NOCC 28, the satellite 20 can be configured to support the desired burst mode on each uplink 22. The exact configuration and amount of resources depends on the business environment and is re-configurable as the business conditions dictate. Except for receive-only terminals, at a minimum, all STs 40 preferably support the 521 ksps burst mode.

As stated previously, the system 10 of the present invention supports connectionless and connection-oriented calls. For a connection-oriented call, an ST 40 communicates with the NOCC 28 to receive tokens with which to request uplink bandwidth from the payload. In this connection mode, the NOCC 28 can determine if sufficient bandwidth is available to meet ST requests therefrom For a connectionless call, an ST 40 communicates with the payload 21 directly without first obtaining authorization from the NOCC 28. The ST first sends an contention channel request to the payload for uplink bandwidth. The payload PCC 12 in turn sends an allocation to the ST, as well as a power measurement to allow the ST to adjust uplink power. The payload 21 receives packet segments from the ST, validates signatures provided therein, schedules packets for downlink transmission and then transmits them.'

2. Uplink Frame Structure

Figures 5, 6, 10:
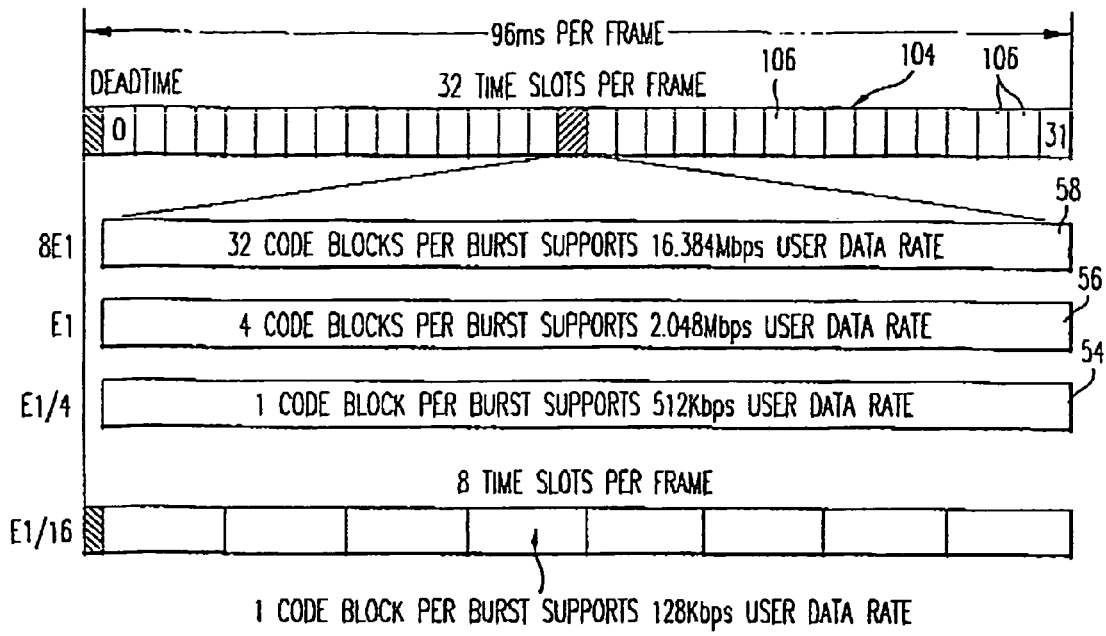

As stated previously in connection with FIG. 4, the uplink frame structure for the three rates of data channels (i.e., 512 kbps, 2 Mbps, and 16 Mbps channels 54, 56 and 58, respectively) preferably consists of a 96 ms frame 104 with 32 slots 106 of 3 ms each, as shown in FIG. 5. The fall-back mode discussed above employs eight slots per frame for 128 kbps channels, for example. STs can send 3 ms bursts of packets into each time slot on each channel to be processed by the satellite payload 21. The number of packets within a time slot varies by rate. For example, a 3 ms burst contains two packets on a 512 kbps channel, eight packets on a 2 Mbps channel, and 64 packets on a 16 Mbps channel. The present invention is described below with reference to the 512 kbps (1/4 E1) rate uplink. It is to be understood that the designs for the 2 Mbps (E1) and 16 Mbps (8E1) uplinks are the same.

For data channels, the numbering of the slot locations in accordance with the present invention is preferably as illustrated in FIG. 6. The frame is depicted for illustrative purposes as a matrix of 8 rows of 4 slots each. The slots in a row are consecutive in time, as are the respective rows. This numbering scheme allows spreading of the slots 106 within a frame 104 more evenly in time for less than full rate users, thereby mitigating jitter and smoothing traffic across uplink channels. A plurality of different slot numbering patterns can be used to spread the traffic load evenly across the channels, as illustrated in FIGS. 7, 8 and 9.

The STs 40 are programmed in accordance with the present invention to convert slot numbers that are assigned pursuant to a numbering scheme (e.g., one of the numbering schemes depicted in FIGS. 6–9) to reduce jitter and provide smoothing to consecutively numbered slots, as shown in FIG. 10. Such conversion permits packets sent using the assigned slots to arrive at the destination ST in the correct order. For example, if an ST 40 is assigned slots 0 through 3, the ST transmits its packets in slots 0, 8, 16 and 24 per the numbering scheme depicted in FIG. 10. Accordingly, the transmitted slots are distributed throughout the frame 104. The use of the number scheme allows for more simple commands to the originating ST as to those slots it is to use. In other words, it is more simple to say that an ST can use the first consecutive four slots per the scheme in FIG. 6 than to provide each slot number (i.e., slots 0, 8, 16 and 24) in a slot allocation command. The slot numbering scheme is also advantageous because it prevents the uneven use of slot numbers across all channels for a frame, thereby promoting the processing of packets by the satellite substantially throughout the frame period, regardless of the traffic load or type. Without the use of such a numbering scheme, the first part of each frame period (i.e., slots 0–15) may be used more often than the slots during the later part of a frame period.

To smooth traffic across all channels during a 96 ms frame, four different numbering schemes (e.g., FIGS. 6–9) are used, for example. Each channel is assigned one of the four patterns by the NOCC 28 when the channel is configured. The NOCC 28 can assign the patterns to the channels such that, on average, the number of packets transmitted in any 3 ms time slot of the uplink frame is approximately equal to the number of packets transmitted in any other 3 ms slot of frame. The NOCC, therefore, assigns one-fourth of the 16 Mbps channels to each pattern, one-fourth of the 2 Mbps channels to each pattern, and so on.

3. Uplink Beams and Channels

The satellite 20 has a plurality of uplink demodulators (e.g., 224 demodulators), as described above with reference to the RF/modem unit 18 of FIG. 2A. Each uplink demodulator preferably supports the equivalent of three 16 Mbps channels 58. Each 16 Mbps channel can be configured as a single 16 Mbps channel 58 or eight 2 Mbps channels 56, as shown in FIG. 4. If configured for eight 2 Mbps channels, each of those can be configured as a single 2 Mbps channel 56 or four 512 Kbps channels 54. Thus, the capacity of the satellite is 21,504 channels if all are configured as 512 Kbps channels 54. An uplink beam 22 preferably requires a minimum of one uplink demodulator. For bandwidth control purposes, the set of channels processed by one demodulator in an uplink beam 22 is preferably considered.

Two types of uplink channels are preferably used in the system 10, that is, contention channels and data channels. A channel is configured as either a contention channel or a data channel at any one time and not both at the same time. In other words, uplink channels preferably operate in one of two modes, that is, as a contention channel or a reserved channel. The satellite payload 21 sends information packets by multicast to every ST in each uplink beam to describe the uplink channel configuration, including which channels are contention channels and which channels are reserved channels. The contention channels preferably operate at the 512 kbps rate.

When an ST uses a contention channel, the ST sends a 3 ms, two-packet burst into a random time slot on the channel, for example. If no other ST sends a burst to the same channel and time slot, the satellite payload 21 is able to process and deliver the packets in the burst. If two or more STs transmit packets on the same channel and time slot and a collision occurs, the payload 21 can process and deliver one burst, while the other burst is lost. It is also possible that the payload 21 is not able to process and deliver either burst. STs do not receive direct confirmation from the satellite payload 21 that it has processed a contention channel burst or that the burst has been lost. STs determine that data sent to a contention channel has been processed by waiting for a response from the satellite payload 21, ST or end user to which the packets were addressed.

STs can use contention channels either for control purposes to send packets to the PCC 12 or a system ST (SST) at the NOCC 28, or, if authorized, for communication purposes to send user data packets to another ST. Some 512 kbps channels can be allocated for data packet contention use only, and other 512 kbps channels can be allocated for either control or data contention bursts.

Contention channels are also used by the ST 40 for bandwidth allocation requests to the BCP 16 in the satellite 20. Bandwidth allocations are made periodically by the BCP 16 based on the requests on its queues. After making its allocations, the BCP 16 transfers any totally unallocated data channels to contention channels. Allocations are packed into a downlink multicast to all ST 40 in an uplink beam, for example. This multicast or cell cast also indicates any additional contention channels (in addition to configured contention channels) available to the ST 40 in the beam 22 for a specified frame. The NOCC 28 preferably configures all channels within all demodulators in all uplink beams as follows: (1) configures uplink rate; (2) configures the slot numbering scheme; and (3) configures the use of each channel (e.g., supervisory contention, BOD contention, data contention, data, or not available).

Assuming the demodulator servicing an uplink beam 22 is configured as 96 channels 58 of rate 512 Kbps, the uplink channels within the beam 22 are used as follows. First, the highest numbered channels are configured as a selected number of contention channels. Data channels preferably start at the lowest numbered channel. All channels except the configured contention channels are available for BOD allocation. Bandwidth allocations or allocations are made by starting with the first data channel and working towards the last channel for rate requests, and starting with the last data channel and working towards the first channel for volume requests. Any unallocated data channels are transferred to temporary (i.e., temporary for one frame) contention channels.

In accordance with frequency reuse rules employed in the system 10, STs transmit data at near optimal power levels for a given atmospheric degradation. An uplink power control algorithm (ULPC) is employed by the STs and the satellite payload 21 whereby STs receive feedback from the satellite to perform a closed loop type of power control. When STs first request bandwidth, they are provided with an initial condition for the control loop, which may not be accurate, to determine the initial power for transmission. The bandwidth requests are sent via a contention channel. The ULPC algorithm provides different performance on the contention channels than on the rate and volume channels. To address uplink power inaccuracies, frequency use constraints are preferably used on contention channels. The type of interference that is a concern occurs when an ST sending data on a contention channel transmits at high power and interferes with an ST sending data at an appropriate power level. By placing the contention channels of nearby isolated cells to be co-frequency, additional interference that may occur due to content channels does not impact rate and volume traffic performance.

4. Rate Requests

Rate requests specify the number of slots 106 in each uplink frame 104 that an ST 40 requires to meet the uplink demands for its connection-oriented traffic. A Rate request results in the allocation of a preferably constant number of slots each frame, which are distributed as evenly in time as possible, that the ST can use to send packets at a constant rate. Each frame preferably has a maximum of 32 slots (FIG. 5). A Rate request specifies from 1 to 32 slots per frame. A full 16 Mbps, 2 Mbps, or 512 Kbps user requests all 32 slots. An 8 Mbps, 1 Mbps, or 256 Kbps user requests 16 slots per frame and so on. The requesting ST gets a constant allocation of that uplink capacity every frame until the request is cancelled by the ST via a de-allocation message to the satellite. Sending rate allocations every frame permits the PCC 12 to move rate allocation slots within a channel or to another channel to perform de-fragmentation of rate allocations. A Rate request has the following information at a minimum: (1) an ST source address (e.g., ST source ID and uplink beam ID); (2) the type of request (i.e., Rate request); (3) the number of slots 106 per frame 104 required; (4) the channel rate (e.g., specify 512 kbps, 2.048 Mbps or 16.384 Mbps or channel, slots, and so on) already on queue (if any); (5) the priority of the request; and (6) security information.

Rate requests are placed on data channels Q1 or Q2 within the memory of BCP memory 16. The requesting ST 40 receives a periodic allocation (or allocation) which specifies the channel, start location, and number of slots. An ST 40 is assigned the same channel and start location on each allocation unless it is notified of a change in channel and/or location. Changes are necessary when a ST makes an additional request (Rate or Volume) and is moved to a new channel and/or location or during realignment for de-fragmentation. Moving is accomplished by removing the request from its current queue if the system satisfies loading conditions on all its channels, and putting it back on GQ1 or GQ2 (depending on priority), to be reallocated on another channel.

Rate requests are queued to the first data channel until its capacity is filled up to a threshold that may be pre-configured or may dynamically adapt to the number of rate requests in the system, then to the second data channel; and so on. Rate requests are packed in this manner to allow data channels with no Rate allocations and no Volume allocations to be transferred to contention channels.

Initial bandwidth requests for a Rate allocation are preferably only sent on a contention channel; however, the message to de-allocate a Rate request can be, and is preferably sent within the Rate allocation being de-allocated. Rate requests are acknowledged by the BCP 16 in one of two ways, that is, a Rate allocated message or a Rate denied message. Rate release (or de-allocate) messages (i.e., rate release request) from the ST 40 are acknowledged by the satellite 20. If the ST does not get a response to a Rate request or Rate release within a selected period of time, it resends the message. If an ST receives a request denied response to a Rate request, it retries no earlier than until a selected period of time has elapsed. Rate requests preferably must be de-allocated (released) by the ST when it is no longer needed.

Rate requests can be increased or decreased by sending another Rate request specifying a different number of slots per frame. This new request is sent using an allocation from the original Rate request. If the request can be granted, the ST receives an accepted message; otherwise, the ST receives a denial message. The BCP 16 does not de-allocate the original Rate request until it has successfully processed the new Rate request (i.e., rate change request).

An ST that has a rain fade, or otherwise does not receive the cell cast message with the allocations, waits until it receives the next cell cast which specifies its allocation to start sending. An ST falling back or going forward to a channel with a different channel rate uses an original rate request, even if the ST already has an active rate on queue for another channel rate. The BCP 16 discards the queued rate when the fallback rate request is received.

5. Volume Requests

Volume requests specify the number of uplink slots an ST requires to send a specific number of packets to another ST. The requesting ST receives a period allocation of one or many slots within a specific frame until the entire number of slots requested has been allocated. The system 10 of the present invention acknowledges that there is some maximum total of uplink bandwidth used for Rate allocations at any one time, and that a portion of the total uplink bandwidth in an uplink beam is available for Volume allocations for bursty packet-type traffic. A Volume allocation is used by an ST 40 to send one or many packets of data on the uplink in a single occurrence, although several such slot allocations may occur in a short period of time to send a file consisting of hundreds of packets (e.g., IP frames segmented into packets).

A Volume request has the following information at minimum: (1) an ST source address; (2) type of request (i.e., Volume request); (3) the priority of the request (i.e., high or low); (4) the number of slots requested; (5) the channel rate; (6) and an indication of whether this is a follow-up request to send additional packets received since the previous request.

An ST can use Volume requests to send large amounts of data on the uplink and, by the use of follow-up requests, almost continuously send data for a long period of time. For example, initial Volume requests for uplink bandwidth are made by sending a message on the uplink on a contention channel for a number of slots required to transmit packets. If the ST receives additional data before the initial request has been completely metered out, a "follow-up" volume request is made by sending an in-band message using a slot allocation of the previous request. The follow-up request is for the number of slots required for packets for which a request has not been made, including the packet for the data displaced by the follow-up request. The ST 40 is provided with a follow-up request timer of greater duration than an initial contention request timer also provided therein. The follow-up request timer is preferably equal to the allocation timer discussed below. A bit within the request indicates whether the request is a follow-up request. When the BCP 16 receives such a request, the BCP 16 finds the original request in the queues (sets of Q3 and Q4) and associates this follow-up request with that request. To accomplish this, the BCP 16 maintains a database 17 (FIG. 2B) for each terminal that includes pointers to the channel on which the terminal is currently receiving an allocation. This allows the BCP 16 to serve all requests from a terminal on the same channel. Using this pointer, the BCP 16 finds the original request to associate with the follow-up request.

In response to a Volume request, the BCP 16 either sends an allocation or sends an acknowledgement in a multicast allocation or acknowledgement packet, respectively, to the requesting ST within preferably a selected number of milliseconds. If no response is received within this amount of time, the ST 40 can re-request on a contention channel. An additional backoff algorithm is provided which increases the random time to send a re-request, based upon the number of times it has been attempted to minimize the likelihood chance of another collision.

Acknowledgements are used to ensure that the ST 40 receives a response, if the request is accepted, within a selected number of milliseconds to reduce the number of re-requests on the contention channels. No acknowledgement is made for follow-up requests since the ST uses the allocation timer value for follow-up requests and assumes it was received unless that timer expires.

An ST 40 receiving either an acknowledgement or the first allocation of a multi-allocation cancels its response timer and sets an allocation timer. This timer is restarted when each allocation is received. If it expires, the ST 40 sends a new request on a contention channel.

For volume requests, only one active request and one follow-up request is preferably allowed in the BCP 16 at any one time per priority or destination. Two request IDs are available per request priority and as many as 126 different destinations, for example. An ST can then send an original volume request using one of the request IDs, send a follow-up request using the other request ID, and continue sending follow-up requests using alternate ones of the request IDs until all of its data is transmitted.

Volume requests may be sent via contention channels or piggyback channels. A terminal that is already receiving allocations for a volume request may preferably use that channel to piggyback other volume requests, original or follow-up, to the same or different destinations. During periods when the uplink beam 22 is oversubscribed and there are a number of slots (i.e., a number greater than or equal to a configured threshold) already on queue for all data channels, the BCP 16 discards all piggybacked volume requests. Such a threshold also exists for volume requests arriving via contention channels, but this threshold is preferably higher than the piggyback threshold.

During request allocation processing, Volume requests that are received by the BCP 16 in the satellite 20 are queued to global queues based on priority, then moved to a specific channels queue according to availability. In particular, the BCP 16 places new Volume requests on either the low or high priority Volume global queue (GQ3 or GQ4); the use of global queues by the BCP 16 is more fully discussed below in Section 7. Volume requests remain on queue within the satellite 20 until they are processed and moved to channel queue Q3 or Q4 depending on their priority. Once a volume request is moved to Q3 or Q4, it remains on queue until the bandwidth requested has been allocated completely or after a configured time-out (e.g., using an allocation timer).

The total number of Volume request entries on a channel's low and high priority Volume queues varies based upon the total capacity available for Volume allocations, the number slots in each Volume request on queue, and latency requirements. The maximum number of requests on queue is configurable.

Volume requests are spread evenly among the available data channels, that is, the first request is queued to the first available channel, the second request to the next available channel, and so on. Thus, if there are ten available channels, and ten volume requests are received within the same timeframe, then theoretically one request is queued to each channel. This is accomplished by maintaining a counter per priority on each channel that count the number of volume requests on the channel, and comparing this counter against a threshold for each channel based on the number of requests in the system. In the queues, the requests are essentially serviced on a round-robin basis.

Fairness is maintained among competing STs attempting to acquire uplink bandwidth in a number of ways. For example, a contention channel for original Volume requests is used so that each ST has an essentially equal chance of success. During periods of moderately heavy traffic, follow-up requests from STs 40 are discarded. This provides other STS 40 using the contention channel a better chance of a successful request. The ST, whose follow-up request has been discarded, does not send another request on the contention channel until its allocation timer expires.

During periods of extremely heavy traffic (e.g., all queues at maximum), the BCP 16 controls the number of re-requests on the contention channel by sending an acknowledgement to requests received on the contention channel, and then by discarding the request. The STs 40 do not make a re-request until the allocation timer expires.

6. ST Contention Channel Usage

An ST making a bandwidth request (Rate or Volume) on a contention channel performs operations which will now be described. If the ST did not receive the BCP 16 cell cast allocation message for the next frame (i.e., it is not aware of additional contention channels), the ST randomizes its bandwidth request over the number of slot locations specified by the configured contention channels only. If this is one channel (i.e. the highest numbered channel in an uplink beam), then the ST picks a slot location from among the 32 slot locations in that channel. If the ST has received a BCP cell cast indicating temporary additional contention channels for the next frame, it randomizes a BOD request over the total slots in the configured and temporary contention channels.

7. Satellite Request Queues

As discussed above, the satellite 20 utilizes multi-level queues (i.e., global queues and local queues) for bandwidth requests. Each uplink beam and each channel data rate within that beam has a set of preferably four queues, referred to as global queues. A global queue GQ1 is provided for new high priority rate requests that have been received in the current frame and that will be processed in the next frame. A global queue GQ2 is provided for new low priority rate requests that have been received in the current frame and that will be processed in the next frame. Global queues GQ3 and GQ4 are provided for new high priority volume requests and new low priority volume requests respectively, that have been received in the current frame and that will be processed in the next frame.

Each uplink channel, except for configured contention channels, preferably has four local queues. A Q1 queue is provided for high priority Rate requests. The total of Q1 requests on queue cannot exceed the capacity of the channel. Thus, one 512 Kbps user, two 256 Kbps users, and so on, can be on this queue. These requests get an allocation every frame equal to the number of slots per frame in the Rate request. Requests on this queue are not preempted by any other request.

A Q2 queue is provided for low priority rate requests. The total of Q1 and Q2 on queue cannot exceed the capacity of the channel. These requests get an allocation every frame equal to the number of slots per frame in the Rate request. Requests on queue Q2 can be preempted by a new high priority Rate request from GQ1 and removed from the queue and either discarded or moved to another channel's Q2 queue. This is accomplished by moving the preempted request back to GQ2, and then processing allocations for it after Q1 and GQ1 are done.

A Q3 queue is provided for Volume requests of high priority packet traffic. A request is for N number of slots. These requests are processed using whatever bandwidth is left over for the channel after the Q1, GQ1, Q2 and GQ2 requests have been allocated and the requests from GQ1 and GQ2 have been moved to Q1 and Q2 respectively for each channel. Requests are not queued to Q3 if the total of Q1 and Q2 equals the maximum capacity of the channel. Additionally, if the request from Q3 is from a ST that already has an allocation on Q1 or Q2, then the request from Q3 and the request from Q1 or Q2 are both moved to another channel.

A Q4 queue is provided for volume requests of low priority packet traffic. A request is for N number of slots. These requests are processed using whatever bandwidth is left over for the channel after the Q1, GQ1, Q2, GQ2, Q3 and GQ3 requests have been allocated. Requests are not queued to Q4 if the total of Q1 and Q2 equals the maximum capacity of the channel. As with Q3, if the request from Q4 is from a ST that has an existing allocation on Q1 or Q2, then the request from Q4 and the request from Q1 or Q2 are moved to another channel. A minimum bandwidth for Q4 and GQ4 can be configured such that Q4 and GQ4 are processed before Q3 and GQ3 once every N frames. For example, if a minimum bandwidth of 5% of Q4 and GQ4 is desired, then Q4 and GQ4 are processed first every twenty frames.

8. Bandwidth Control Processor (BCP) Uplink Allocation Algorithm

The BCP 16 in the satellite 20 makes Rate and Volume allocations a selected number of times each frame (e.g., once per frame). The BCP makes bandwidth allocations for the fourth frame in the future to allow for downlink queuing and space delay to the ST 40. The STs 40 are allocated the bandwidth required in the requests on queue.

Figure 11:
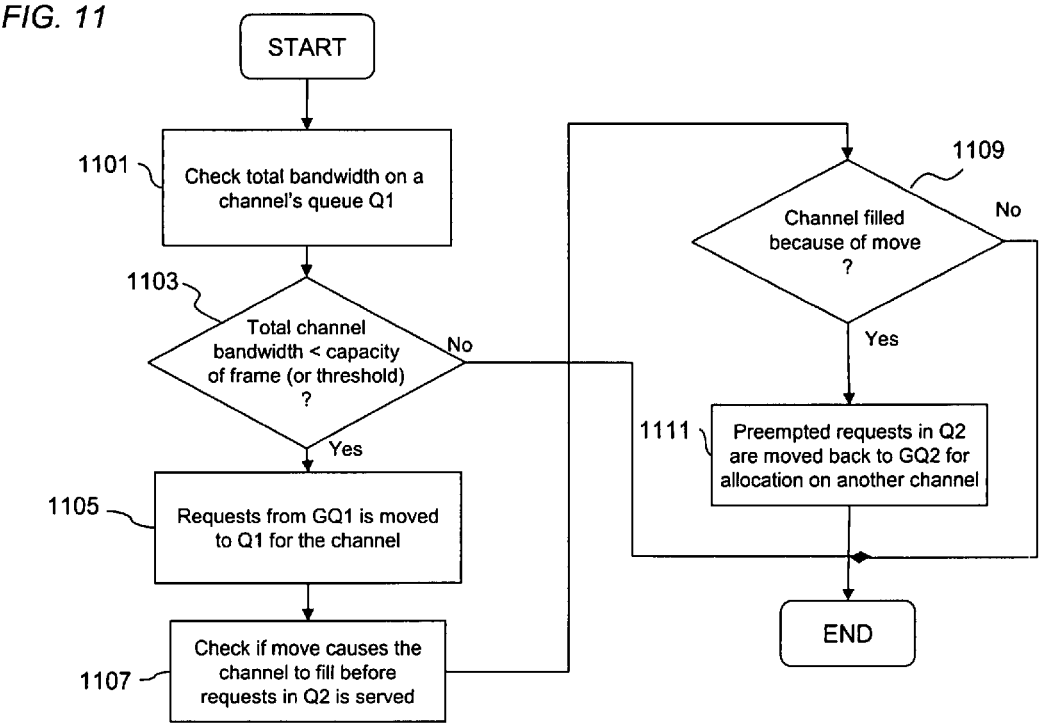
FIG. 11 is a flowchart of the volume request allocation process in a multi-level queuing scheme, according to an embodiment of the present invention.

FIG. 11 shows a flowchart of the process of allocating the rate requests, with respect to the management of the global queues GQ1 and GQ2 and the local queues Q1 and Q2. The total of the bandwidth required for Rate requests on a channel's Q1 and Q2 queue can equal, but does not exceed, the capacity of a frame, or a pre-configured or dynamic threshold, for that channel. Accordingly, the BCP 16 determines the amount of total bandwidth that is available on the Q1 queue for a particular channel, per step 1101. If the total bandwidth on a channel's Q1 queue is less than the capacity of a frame, or a pre-configured or dynamic threshold, for that channel (step 1103), requests from GQ1 will be moved, as in step 1105, to Q1 for the channel. During the execution of step 1105, the BCP 16 must check whether the move causes the channel to fill up before the rate requests in Q2 is served (step 1107). If this procedure of moving a request from GQ1 to Q1 causes the channel to be filled before existing requests in that channel's Q2 can be served (step 1109), then the requests in Q2 are said to be preempted. In such a case, requests in Q2 that are preempted are moved back to GQ2, to be allocated on another channel, per step 1111. To minimize the occurrence of preemption, BCP 16 may preferably attempt to allocate requests from GQ2 on free channels and perform this preemption only if it has determined that requests in GQ1 cannot be served by any other channel in the frame.

Figure 12:
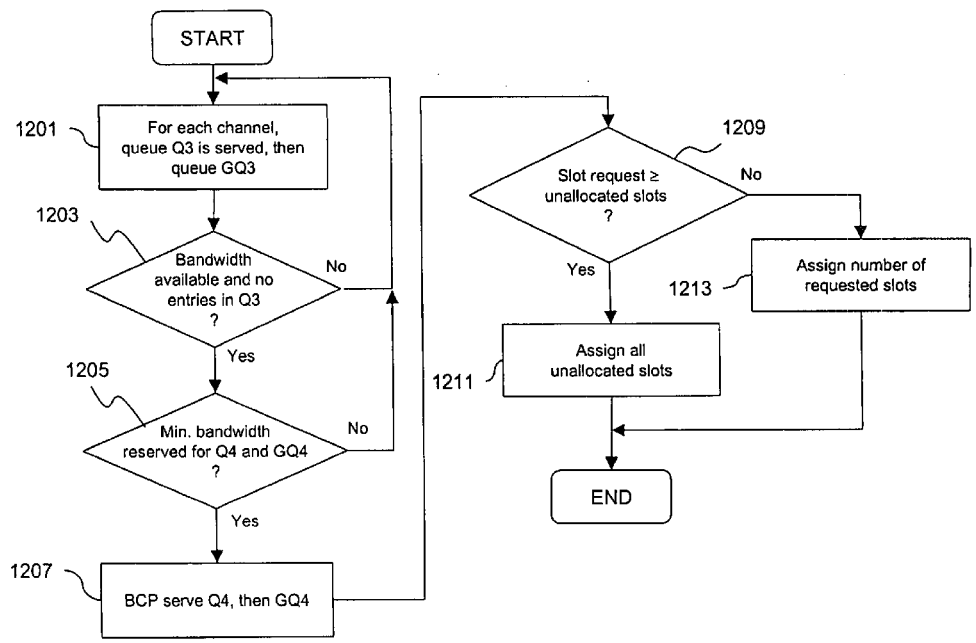
FIG. 12 is a flowchart of the rate request allocation process in a multi-level queuing scheme, according to an embodiment of the present invention.

FIG. 12 shows a flowchart of the Volume request allocation process, according to one embodiment of the present invention. The BCP 16 processing of Volume requests on Q3 and Q4, if any, will now be described. Queues Q3 and Q4 are round robin queues, that is, requests on these queues each get an equal chance to be allocated bandwidth. Each time the BCP 16 makes a bandwidth allocation for a request on queue Q3 or Q4, the BCP moves to the next request on queue for the next allocation, and so on. For each channel on which to make allocations, as in step 1201, the BCP 16 starts with the queue Q3 and proceeds to queue GQ3. The BCP 16 checks whether bandwidth is available and that there are no entries on Q3 (step 1203); the BCP 16 only processes the queues Q4 and GQ4 upon determining that bandwidth is available and that queue Q3 contains no requests. However, the BCP 16 is required to check, as in step 1205, whether a minimum bandwidth is configured (or reserved) for Q4 and GQ4, in which case Q4 is first processed, followed by GQ4 (step 1207). The BCP 16 attempts to allocate the entire unallocated portion of a frame (i.e., a maximum of 32 slots) to the next ST on the queues Q3, GQ3 or Q4, GQ4 (i.e., queues Q3 and GQ3 are not used). In step 1209, the BCP 16 determines whether the number of slots requested is greater than the number of unallocated slots. If the ST's request is equal to, or more than, the number of unallocated slots in the channel, the ST is assigned all unallocated slots (step 1211), which are made available by the downlink congestion control mechanism of the PCC 12; otherwise it is allocated less slots (step 1213). If the ST is not allocated all unallocated slots, the second ST on queue is allocated bandwidth, and so on, until all the slots are allocated or there are no more requests. The BCP 16 decrements the number of slots allocated from the number requested for the ST or ST's that were allocated slots and moves its pointer to the next ST on queue when processing resumes. If an ST's allocation depletes the requested slots, the request is removed from the queue and discarded. Each Volume request on queue has a time stamp of the last time the request received an allocation. It this time exceeds the allocation timer value used by the ST the request is discarded.

9. Downlink Cells and BCP Cell Cast Messages

The BCP 16 merges all the allocations for an uplink beam 22 into one or more packets and uses a cell cast to the center sub-cell of the downlink cell 24 which corresponds to the uplink beam 22 to send the slot allocations to the ST 40 in the beam 22. Each uplink beam 22 has a corresponding downlink cell 24 consisting of 7 sub-cells 24a through 24g. A downlink burst is, by way of an example, equal to one slot of twelve packets. At some interval, the downlink process takes twelve packets, or fewer packets if there are not twelve packets on queue, from a downlink cell's queue, points to the center sub-cell 24 and transmits the cell cast burst to each sub-cell in an uplink beam.

The BCP 16 in the satellite 20 transmits different information every frame in a cell cast message to all STs 40 within an uplink beam 22 that are also in the same downlink cell 24a, 24b, 24c, 24d, 24e, 24f or 24g. For example, the information in every frame preferably includes: (1) rate allocation or denial messages in response to Rate requests; (2) acknowledgements to Volume requests received via contention channels; (3) slot allocations, in response to Rate and Volume requests, for a specified frame in the future; and (4) the number and carrier of the temporary additional contention channels available for a specified frame in the future. The cell cast information described above is packed into one downlink packet, or multiple packets if necessary, and sent via a cell cast address to be received by all the ST 40 within a downlink cell.

10. BCP Allocations

The BCP packs all allocations destined for the ST that have allocations in the same downlink beam 24 into one or more cell cast messages. The common portion of the message contains the uplink frame for which the allocations apply and other information used by all STs 40. The allocation portion of the message preferably has three sections, that is, temporary contention channels, Rate allocations, and Volume allocations.

The Rate allocation section contains individual allocations with preferably the following information: (1) uplink channel; (2) slot start location within the frame (i.e., one of slots 0–31); (3) the number of contiguous slots less 1; (4) priority; and (5) slot numbering pattern. The volume allocation section contains individual allocations with preferably the following information: (1) ST source address; (2) uplink channel; (3) burst start location (i.e., one of slots 0–31); (4) the number of contiguous slots minus 1; (5) an indication of whether it is the last allocation of request; (6) priority (i.e., high or low); and (7) slot numbering pattern.

11. Broadcast Message Protocol

BOD requires that the ST 40 and the satellite 20 have a message exchange and event timers to stay synchronized. The protocol for Rate request will now be described. First, the ST 40 sends a Rate request on a contention channel and starts its response timer. If the satellite 20 receives the request, it sends either an accepted or denied response. If the ST 40 receives an accepted response, the Rate is on queue in the satellite 20. If the ST 40 receives a denied response from the satellite 20, the ST starts its 750 ms re-request timer and sends another Rate request when the re-request timer expires. If the ST response timer expires, the ST sends another Rate request immediately and starts its response timer.

The protocol for Rate de-allocations will now be described. The ST 40 sends a Rate de-allocation message, using the latest allocation received for the Rate, and starts its response timer. If the satellite 20 receives the message, the satellite sends a de-allocated response. If the ST 40 does not receive a de-allocated message, its response timer expires and it sends another Rate de-allocation message to the satellite, using the latest allocation received for the Rate. The ST also starts its response timer.

The protocol for Volume requests will now be described. The ST sends a Volume request on a contention channel and starts its response timer. If the satellite 20 receives and accepts the request it sends either an acknowledgement or an allocation to the ST. If the ST 40 receives the acknowledgement or allocation, and the allocation was not for the total slots requested, the ST starts its allocation timer. If the ST receives neither an acknowledgement nor an allocation before its response timer expires, it sends another Volume request and starts its response timer. Each time the ST receives an allocation for its request, and it is not the last allocation of the request, it restarts its allocation timer. If the allocation timer expires and the ST has more packets to send, the ST sends another Volume request on a contention channel and starts its response timer. When the ST receives its last allocation of a request and it has more packets to send, it uses one of the slots in the allocation to send a follow-up request for additional slots and starts its allocation timer.

12. Uplink Frame Fragmentation

The BCP 16 looks upon a frame as 32 consecutive slots. As stated previously, a slot numbering scheme is preferably used as described with reference to FIGS. 6–9. Thus, when assigning the Rate requests for a channel, the BCP gives the first request on queue the first consecutive slots in a frame starting with slot 0. The second Rate request on queue is assigned consecutive slots starting from the last slot of the first request, and so on, until all Rate requests are assigned. The BCP performs a similar process with volume requests. The first volume request on queue is given as many of the 32 consecutive slots in the frame being allocated as are available and it can use, then the next volume request on queue is assigned the next consecutive slots, and so on. This almost completely eliminates the need to perform de-fragmentation on a frame. A channel with four 128 K Rate allocations is automatically de-fragmented when any request is released (i.e., de-allocated), and the remaining Rate requests are allocated when the allocations are made for the next frame.

On occasions when fragmentation occurs in the system due to the order of establishing and releasing rate requests, the BCP may receive and process a defragmentation command, specifying the uplink cell for which all channels must be defragmented. In such a case, the BCP may preferably cycle through all the channels and remove all the requests in Q1 and Q2 of each channel, putting them back on GQ1 and GQ2 depending on priority of requests. Then the BCP will process all the requests on GQ1 and GQ2, treating them all as new rate requests, and reallocate them over the channels.

13. Bandwidth Allocations

The Bandwidth Control (BC) Algorithm makes allocations once per frame for the uplink frame that is approximately 2½ frames in the future. It processes each uplink beam and makes allocations for requests on queue in the following sequence, while executing a loop over all channels and channel rates within an uplink beam: (1) Existing High Priority Rate Allocations; (2) New High Priority Rate Allocations; (3) Existing Low Priority Rate Allocations; (4) New Low Priority Rate Allocations; (5) Existing and New High Priority Volume Allocations; and (6) Existing and New Low Priority Volume Allocations.

The BCP 16 lookahead for volume allocations is one frame rather than allocating several frames in advance, say 10 frames. In an oversubscribed uplink, no matter how many advance frames are used, the result is at most one available unallocated frame at any one time. The first request received gets allocated all 10 frames in the lookahead. If in the next frame another request is received, 9 of the 10 lookahead frames have already been allocated in the previous frame. Thus, the second request is only given the tenth frame, and so on. In a fully loaded system, nothing is allocated on a per frame basis other than the farthest frame in the future in the lookahead. Thus, it is advantageous to have small lookahead. A small lookahead interval is easier to manage, and handles priorities better, among other benefits. In this system 10, a two frame lookahead can be used, instead of an optimal one frame lookahead, to limit the allocations on the downlink.

The BCP 16 preferably queues the volume requests and sends out many allocations, instead of giving the requesting ST 40 what is available at that moment, and allowing the ST to re-request for the unallocated portion of the request.

Assuming an oversubscribed uplink with one frame to allocate at any point in time, not queuing causes a significant increase in requests since only a small portion of each request can be allocated at the instant the request arrives. This either overburdens the contention channels (i.e., if there are no follow-up requests) or decreases data bandwidth by displacing data with follow-up requests. It is more efficient to queue volume requests, with several others, use a round robin allocation scheme to mete out allocations to everyone on queue, thereby satisfying all ST's with an allocation every 400–500 ms or so until the entire requests are satisfied.

Another advantage of the present invention is the fairness of follow-up requests to ST's making aloha requests when the number of contention channels becomes reduced due to heavy packet load. In an oversubscribed uplink, the BCP 16 attempts to fill the uplink and be fair to competing ST at the same time. The BCP 16 ignores follow-up requests if there are more than a selected number of requests on queue already. The sender of the follow-up request then waits until the allocation timer expires to send a new aloha request.

Figure 13:
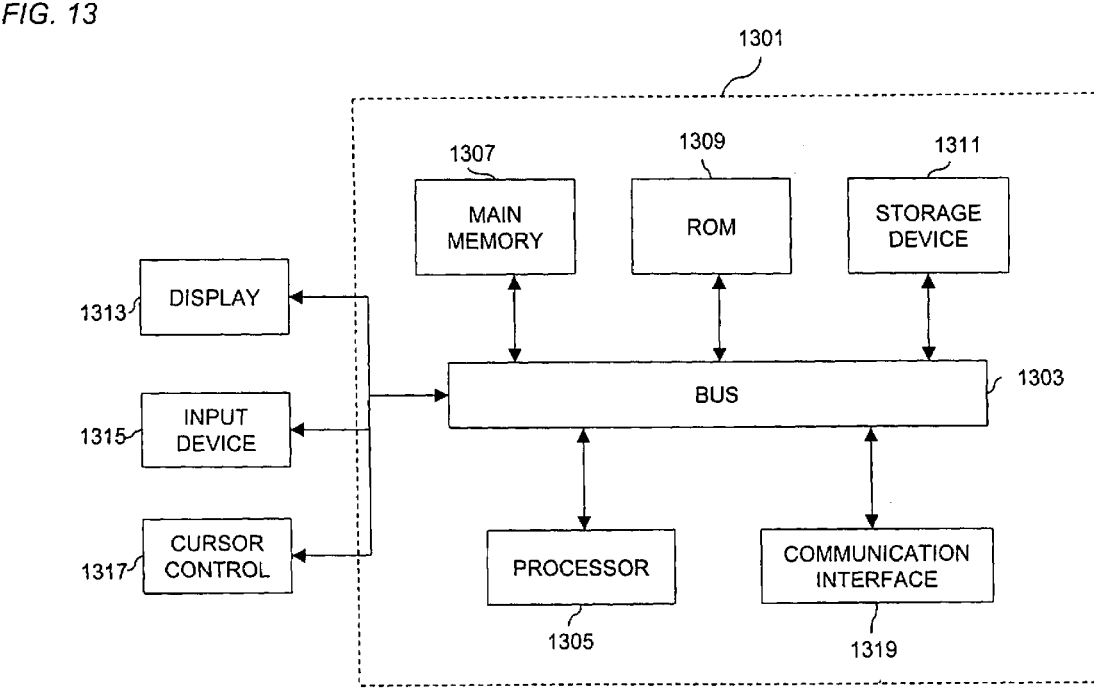
FIG. 13 is a diagram of a general purpose computer system capable of performing bandwidth control functions, in accordance with an embodiment of the present invention.

FIG. 13 illustrates a computer system 1301 upon which an embodiment according to the present invention may be implemented to control bandwidth allocation. Computer system 1301 includes a bus 1303 or other communication mechanism for communicating information, and a processor 1305 coupled with bus 1303 for processing the information. Computer system 1301 also includes a main memory 1307, such as a random access memory (RAM) or other dynamic storage device, coupled to bus 1303 for storing information and instructions to be executed by processor 1305. In addition, main memory 1307 may be used for storing temporary variables or other intermediate information during execution of instructions to be executed by processor 1305. Computer system 1301 further includes a read only memory (ROM) 1309 or other static storage device coupled to bus 1303 for storing static information and instructions for processor 1305. A storage device 1311, such as a magnetic disk or optical disk, is provided and coupled to bus 1303 for storing information and instructions.

Computer system 1301 may be coupled via bus 1303 to a display 1313, such as a cathode ray tube (CRT), for displaying information to a computer user. An input device 1315, including alphanumeric and other keys, is coupled to bus 1303 for communicating information and command selections to processor 1305. Another type of user input device is cursor control 1317, such as a mouse, a trackball, or cursor direction keys for communicating direction information and command selections to processor 1305 and for controlling cursor movement on display 1313.

According to one embodiment, bandwidth control functions are provided by computer system 1301 in response to processor 1305 executing one or more sequences of one or more instructions contained in main memory 1307. Such instructions may be read into main memory 1307 from another computer-readable 11 medium, such as storage device 1311. Execution of the sequences of instructions contained in main memory 1307 causes processor 1305 to perform the process steps described herein. One or more processors in a multi-processing arrangement may also be employed to execute the sequences of instructions contained in main memory 1307. In alternative embodiments, hard-wired circuitry may be used in place of or in combination with software instructions. Thus, embodiments are not limited to any specific combination of hardware circuitry and software.

Further, the functions of the BCP 16 may reside on a computer-readable medium. The term "computer-readable medium" as used herein refers to any medium that participates in providing instructions to processor 1305 for execution. Such a medium may take many forms, including but not limited to, non-volatile media, volatile media, and transmission media. Non-volatile media includes, for example, optical or magnetic disks, such as storage device 1311. Volatile media includes dynamic memory, such as main memory 1307. Transmission media includes coaxial cables, copper wire and fiber optics, including the wires that comprise bus 1303. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1305 for execution. For example, the instructions may initially be carried on a magnetic disk of a remote computer. Bus 1303 carries data to main memory 1307, from which processor 1305 retrieves and executes the instructions. The instructions received by main memory 1307 may optionally be stored on storage device 1311 either before or after execution by processor 1305.

Computer system 1301 also includes a communication interface 1319 coupled to bus 1303. Communication interface 1319 sends and receives electrical, electromagnetic or optical signals that carry digital data streams representing various types of information.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method of performing bandwidth allocations, the method comprising:
   receiving a bandwidth request from a terminal, wherein the bandwidth request includes a rate request;
   determining bandwidth request type and priority of the received bandwidth request;
   placing the bandwidth request in one of a plurality of a global queues based upon the determining step, each of the global queues corresponding to a data rate of each of a plurality of channels;
   moving the bandwidth request from the one global queue to one of a plurality of local queues, the plurality of local queues corresponding to the plurality of channels, wherein the bandwidth request is moved based on loading of the channels;
   filling the one local queue with subsequent rate requests up to a queuing threshold that is dynamically established according to a total number of rate requests in the local queues;
   filling another one of the local queues with additional rate requests upon filling the one local queue beyond the queuing threshold; and
   allocating transmission slots in response to the bandwidth request stored in the one local queue.

2. The method as in claim 1, wherein the bandwidth request includes a volume request, the rate request specifying a constant number of transmission slots, the volume request specifying a specific number of transmission slots.

3. The method as in claim 1, wherein the queuing threshold in the step of filling the one local queue is predetermined.

4. The method as in claim 1, wherein the global queues in the placing step are designated according to the bandwidth request type and the associated priority.

5. The method as in claim 1, wherein the bandwidth request type and priority of the received bandwidth request include a high priority rate request, a low priority rate request, a high priority volume request, and a low priority volume request.

6. The method as in claim 1, wherein the bandwidth request in the receiving step includes a volume request and is received over at least one of a contention channel or a data channel, the method further comprising:
   receiving a piggybacked volume request over the data channel;
   placing the piggybacked volume request in a corresponding one of the global queues;
   determining whether the plurality of channels are oversubscribed; and
   selectively discarding the piggybacked volume request based upon the step of determining whether the plurality of channels are oversubscribed.

7. The method as in claim 6, wherein the step of determining whether the plurality of channels are oversubscribed comprises:
   determining whether each of the plurality of local queues exceeds a respective queuing threshold.

8. The method as in claim 1, wherein the plurality of channels are designated as data channels that are sequentially ordered, the allocating step comprising:
   selectively assigning the transmission slots according to a prescribed order of the data channels based upon the bandwidth request type.

9. The method as in claim 8, wherein the prescribed order in the selectively assigning step begins with the first data channel if the bandwidth request type is rate request.

10. The method as in claim 8, wherein the prescribed order in the selectively assigning step begins with the last data channel if the bandwidth request type is volume request.

11. A method of performing bandwidth allocations, the method comprising:
   receiving a bandwidth request from a terminal;
   determining bandwidth request type and Priority of the received bandwidth request;
   placing the bandwidth request in one of a plurality of a global queues based upon the determining step, each of the global queues corresponding to a data rate of each of a plurality of channels;
   moving the bandwidth request from the one global queue to one of a plurality of local queues, the plurality of local queues corresponding to the plurality of channels, wherein the bandwidth request is moved based on loading of the channels;
   allocating transmission slots in response to the bandwidth request stored in the one local queue;
   receiving a plurality of rate requests;
   receiving a defragmentation command; and
   moving the rate requests from the local queues to the corresponding global queues for reallocation in response to the defragmentation command.

12. The method as in claim 1, wherein the bandwidth request is an original volume request, the method further comprising:
   receiving a follow-up volume request;
   associating the follow-up volume request with the original volume request; and
   placing the follow-up volume request to a particular local queue that stored the original bandwidth request among the plurality of local queues.

13. A method of performing bandwidth allocations, the method comprising:
   receiving a bandwidth request from a terminal, wherein the bandwidth request includes an original volume request;
   determining bandwidth request type and priority of the received bandwidth request;
   placing the bandwidth request in one of a plurality of a global queues based upon the determining step, each of the global queues corresponding to a data rate of each of a plurality of channels;
   moving the bandwidth request from the one global queue to one of a plurality of local queues, the plurality of local queues corresponding to the plurality of channels, wherein the bandwidth request is moved based on loading of the channel;
   allocating transmission slots in response to the bandwidth request stored in the one local queue;
   receiving a follow-up volume request;
   associating the follow-up volume request with the original volume request;
   placing the follow-up volume request to a particular local queue that stored the original bandwidth request among the plurality of local queues; and
   maintaining a database of pointers for the terminal, one of the pointers specifying the particular local queue.

14. The method as in claim 1, further comprising:
   receiving a plurality of volume requests; and
   spreading the volume requests across each of the local queues.

15. The method as in claim 14, wherein each of the local queues has a counter that counts a quantity of the volume requests in the respective local queue, the distributing step comprising:
   comparing counter values of the counters with respective predetermined thresholds corresponding to the local queues.

16. A communication system for performing bandwidth allocations, the system comprising:
   a plurality of global queues, each of the global queues being configured to store a bandwidth request received from a terminal, wherein the bandwidth request includes a rate request;
   a bandwidth control processor (BCP) coupled the plurality of global queues, the bandwidth control processor being configured to determine bandwidth request type and priority of the received bandwidth request and to place the bandwidth request in one of a plurality of a global queues based upon the determined bandwidth request type and priority, wherein each of the global queues corresponds to a data rate of each of a plurality of channels; and
   a plurality of local queues coupled to the BCP, the plurality of local queues corresponding to the plurality of channels, one of the plurality of local queues storing the bandwidth request which is moved from the one global queue based on loading of the channels, the one local queue being filled with subsequent rate requests up to a queuing threshold that is dynamically established according to a total number of rate requests in the local queues, another one of the local queues being filled up with additional rate requests in response to the one local queue being filled beyond the queuing threshold, wherein the BCP allocates transmission slots in response to the bandwidth request stored in the one local queue.

17. The system as in claim 16, wherein the bandwidth request includes a volume request, the rate request specifying a constant number of transmission slots, the volume request specifying a specific number of transmission slots.

18. The system as in claim 16, wherein the queuing threshold is predetermined.

19. The system as in claim 16, wherein the global queues are designated according to the bandwidth request type and the associated priority.

20. The system as in claim 16, wherein the bandwidth request type and priority of the received bandwidth request include a high priority rate request, a low priority rate request, a high priority volume request, and a low priority volume request.

21. The system as in claim 16, wherein the bandwidth request includes a volume request and is received over at least one of a contention channel or a data channel, a follow-up volume request associated with the volume request being placed in a corresponding one of the global queues, the BCP selectively discarding the follow-up volume request upon determining that the plurality of channels are oversubscribed.

22. The system as in claim 21, wherein the BCP determines oversubscription of the plurality of channels by examining whether each of the plurality of local queues exceeds a respective queuing threshold.

23. The system as in claim 16, wherein the plurality of channels are designated as data channels that are sequentially ordered, the BCP selectively assigning the transmission slots according to a prescribed order of the data channels based upon the bandwidth request type.

24. The system as in claim 23, wherein the prescribed order begins with the first data channel if the bandwidth request type is rate request.

25. The system as in claim 23, wherein the prescribed order begins with the last data channel if the bandwidth request type is volume request.

26. A communication system for performing bandwidth allocations, the system comprising:
  a plurality of global queues, each of the global queues being configured to store a bandwidth request received from a terminal;
  a bandwidth control processor (BCP) coupled the plurality of global queues, the bandwidth control processor being configured to determine bandwidth request type and priority of the received bandwidth request and to place the bandwidth request in one of a plurality of a global queues based upon the determined bandwidth request type and priority wherein each of the global queues corresponds to a data rate of each of a plurality of channels; and
  a plurality of local queues coupled to the BCP, the plurality of local queues corresponding to the plurality of channels, one of the plurality of local queues storinq the bandwidth request which is moved from the one global queue based on loading of the channels, wherein the BCP allocates transmission slots in response to the bandwidth request stored in the one local queue,
  wherein the BCP is configured to move rate requests from the local queues to the corresponding global queues for reallocation in response to a defragmentation command.

27. The system as in claim 16, wherein the bandwidth request is an original volume request, the BCP associating a follow-up volume request with the original volume request and placing the follow-up volume request to a particular local queue that stored the original bandwidth request among the plurality of local queues.

28. A communication system for performing bandwidth allocations, the system comprising:
  a plurality of global queues, each of the global queues being configured to store a bandwidth request received from a terminal;
  a bandwidth control processor (BCP) coupled the plurality of global queues, the bandwidth control processor being configured to determine bandwidth request type and priority of the received bandwidth request and to place the bandwidth request in one of a plurality of a global queues based upon the determined bandwidth request type and priority, wherein each of the global queues corresponds to a data rate of each of a plurality of channels; and
  a plurality of local queues coupled to the BCP, the plurality of local queues corresponding to the plurality of channels, one of the plurality of local queues storing the bandwidth request which is moved from the one global queue based on loading of the channels, wherein the BCP allocates transmission slots in response to the bandwidth request stored in the one local queue, wherein the bandwidth request includes an original volume request, the BCP associating a follow-up volume request with the original volume request and placing the follow-up volume request to a particular local queue that stored the original bandwidth request among the plurality of local queues; and
  a database coupled to the BCP, the database storing a plurality of pointers for the terminal, one of the pointers specifying the particular local queue.

29. The system as in claim 16, wherein one of the global queues stores a plurality of volume requests, the BCP spreading the volume requests across the local queues.

30. The system as in claim 29, wherein each of the local queues has a counter that counts a quantity of the volume requests in the respective local queue, the BCP comparing counter values of the counters with predetermined thresholds corresponding to the local queues.

31. A computer readable medium containing program instructions for execution on a computer system, which when executed by a computer, cause the computer system to perform method steps for allocating bandwidth, said method comprising the steps of:
  receiving a bandwidth request from a terminal, wherein the bandwidth request includes a rate request;
  determining bandwidth request type and priority of the received bandwidth request;
  placing the bandwidth request in one of a plurality of a global queues based upon the determining step, each of the global queues corresponding to a data rate of each of a plurality of channels;
  moving the bandwidth request from the one global queue to one of a plurality of local queues, the plurality of local queues corresponding to the plurality of channels, wherein the bandwidth request is moved based on loading of the channels;
  filling the one local queue with subsequent rate requests up to a queuing threshold that is dynamically established according to a total number of rate requests in the local queues;
  filling another one of the local queues with additional rate requests upon filling the one local queue beyond the queuing threshold; and allocating transmission slots in response to the bandwidth request stored in the one local queue.

32. The computer-readable medium as in claim 31, wherein the bandwidth request includes a volume request, the rate request specifying a constant number of transmission slots, the volume request specifying a specific number of transmission slots.

33. The computer-readable medium as in claim 31, wherein the queuing threshold in the step of filling the one local queue is predetermined.

34. The computer-readable medium as in claim 31, wherein the global queues in the placing step are designated according to the bandwidth request type and the associated priority.

35. The computer-readable medium as in claim 31, wherein the bandwidth request type and priority of the received bandwidth request include a high priority rate request, a low priority rate request, a high priority volume request, and a low priority volume request.

36. The computer-readable medium as in claim 31, wherein the bandwidth request in the receiving step includes a volume request and is received over at least one of a contention channel or a data channel, the computer-readable medium further comprising computer-executable instructions for causing the computer system to perform the steps of:
receiving a piggybacked volume request over the data channel;
placing the piggybacked volume request in a corresponding one of the global queues;
determining whether the plurality of channels are oversubscribed; and
selectively discarding the piggybacked volume request based upon the step of determining whether the plurality of channels are oversubscribed.

37. The computer-readable medium as in claim 36, wherein the step of determining whether the plurality of channels are oversubscribed comprises:
determining whether each of the plurality of local queues exceeds a respective queuing threshold.

38. The computer-readable medium as in claim 31, wherein the plurality of channels are designated as data channels that are sequentially ordered, the allocating step comprising:
selectively assigning the transmission slots according to a prescribed order of the data channels based upon the bandwidth request type.

39. The computer-readable medium as in claim 38, wherein the prescribed order in the selectively assigning step begins with the first data channel if the bandwidth request type is rate request.

40. The computer-readable medium as in claim 38, wherein the prescribed order in the selectively assigning step begins with the last data channel if the bandwidth request type is volume request.

41. A computer readable medium containing program instructions for execution on a computer system, which when executed by a computer, cause the computer system to perform method steps for allocating bandwidth, said method comprising the steps of:
receiving a bandwidth request from a terminal;
determining bandwidth request type and priority of the received bandwidth request;
placing the bandwidth request in one of a plurality of a global queues based upon the determining step, each of the global queues corresponding to a data rate of each of a plurality of channels;
moving the bandwidth request from the one global queue to one of a plurality of local queues, the plurality of local queues corresponding to the plurality of channels, wherein the bandwidth request is moved based on loading of the channels;
allocating transmission slots in response to the bandwidth request stored in the one local queue;
receiving a plurality of rate requests;
receiving a defragmentation command; and
moving the rate requests from the local queues to the corresponding global queues for reallocation in response to the defragmentation command.

42. The computer-readable medium as in claim 31, wherein the bandwidth request is an original volume request, the computer-readable medium further comprising computer-executable instructions for causing the computer system to perform the steps of:
receiving a follow-up volume request;
associating the follow-up volume request with the original volume request; and
placing the follow-up volume request to a particular local queue that stored the original bandwidth request among the plurality of local queues.

43. A computer readable medium containing program instructions for execution on a computer system, which when executed by a computer, cause the computer system to perform method steps for allocating bandwidth, said method comprising the steps of:
receiving a bandwidth request from a terminal, wherein the bandwidth request includes an original volume request;
determining bandwidth request type and priority of the received bandwidth request;
placing the bandwidth request in one of a plurality of a global queues based upon the determining step, each of the global queues corresponding to a data rate of each of a plurality of channels;
moving the bandwidth request from the one global queue to one of a plurality of local queues, the plurality of local queues corresponding to the plurality of channels, wherein the bandwidth request is moved based on loading of the channels;
allocating transmission slots in response to the bandwidth request stored in the one local queue;
receiving a follow-up volume request;
associating the follow-up volume request with the original volume request;
placing the follow-up volume request to a particular local queue that stored the original bandwidth request among the plurality of local queues; and
maintaining a database of pointers for the terminal, one of the pointers specifying the particular local queue.

44. The computer-readable medium as in claim 31, further comprising computer-executable instructions for causing the computer system to perform the steps of:
receiving a plurality of volume requests; and
spreading the volume requests across each of the local queues.

45. The computer-readable medium as in claim 44, wherein each of the local queues has a counter that counts a quantity of the volume requests in the respective local queue, the distributing step comprising:
comparing counter values of the counters with respective predetermined thresholds corresponding to the local queues.

* * * * *